(12) United States Patent
Violette

(10) Patent No.: US 7,503,750 B1
(45) Date of Patent: Mar. 17, 2009

(54) VARIABLE PITCH ROTOR BLADE WITH DOUBLE FLEXIBLE RETENTION ELEMENTS

(75) Inventor: John A. Violette, Granby, CT (US)

(73) Assignee: Rotating Composite Technologies, LLC, Simsbury, CT (US)

( * ) Notice: Subject to any disclaimer, the term of this patent is extended or adjusted under 35 U.S.C. 154(b) by 508 days.

(21) Appl. No.: 11/349,817

(22) Filed: Feb. 7, 2006

Related U.S. Application Data

(60) Provisional application No. 60/651,089, filed on Feb. 7, 2005.

(51) Int. Cl.
*B64C 11/12* (2006.01)

(52) U.S. Cl. ................ 416/134 A; 416/149; 416/204 A

(58) Field of Classification Search ............. 416/134 A, 416/134 R, 136, 135, 149, 147, 131, 248, 416/204 R, 204 A, 222, 205, 168 A, 138, 416/240
See application file for complete search history.

(56) References Cited

U.S. PATENT DOCUMENTS

| | | | |
|---|---|---|---|
| 3,451,484 A | 6/1969 | Sawicki et al. | |
| 4,563,129 A | 1/1986 | Pagluica | |
| 5,163,817 A | 11/1992 | Violette et al. | |
| 5,228,834 A | * | 7/1993 | Yamamoto et al. ...... 416/134 A |

FOREIGN PATENT DOCUMENTS

| | | |
|---|---|---|
| GB | 1003940 A | 9/1965 |
| GB | 1232232 A | 5/1971 |
| WO | WO02/085705 A1 | 10/2002 |

OTHER PUBLICATIONS

International Search Report and Written Opinion dated Sep. 24, 2007.

* cited by examiner

*Primary Examiner*—Richard Edgar
(74) *Attorney, Agent, or Firm*—Michaud-Duffy Group LLP

(57) ABSTRACT

A propulsive thrust device for an engine includes a rotor blade and a hub assembly on which the rotor blade is mounted. The rotor blade comprises an airfoil and at least two support members. A propeller thrust device includes a rotor blade, a central hub at which the rotor blade centrifugal load is supported, and an outer hub supporting a control mechanism mechanically connected to the rotor blade and controllable to vary the pitch of the rotor blade on the central hub. A rotor blade for an aircraft engine or in a separate ducted fan housing driven by a powered shaft or gearbox output shaft includes an airfoil and first and second support members attached to the airfoil. An extended arm or portion of the structure at the root of the airfoil of each blade is attached to a controllable mechanism that can vary the pitch of all blades simultaneously.

19 Claims, 13 Drawing Sheets

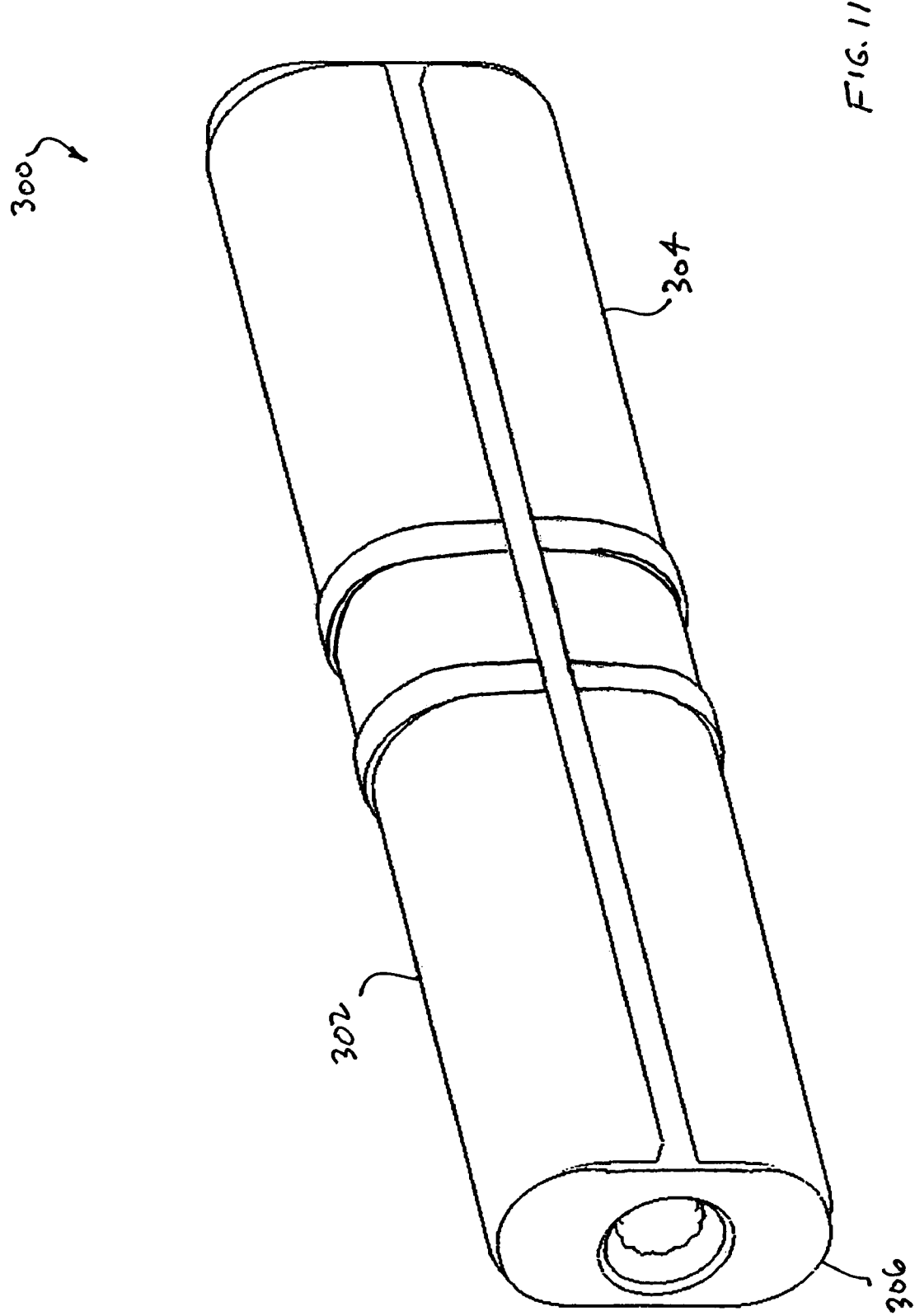

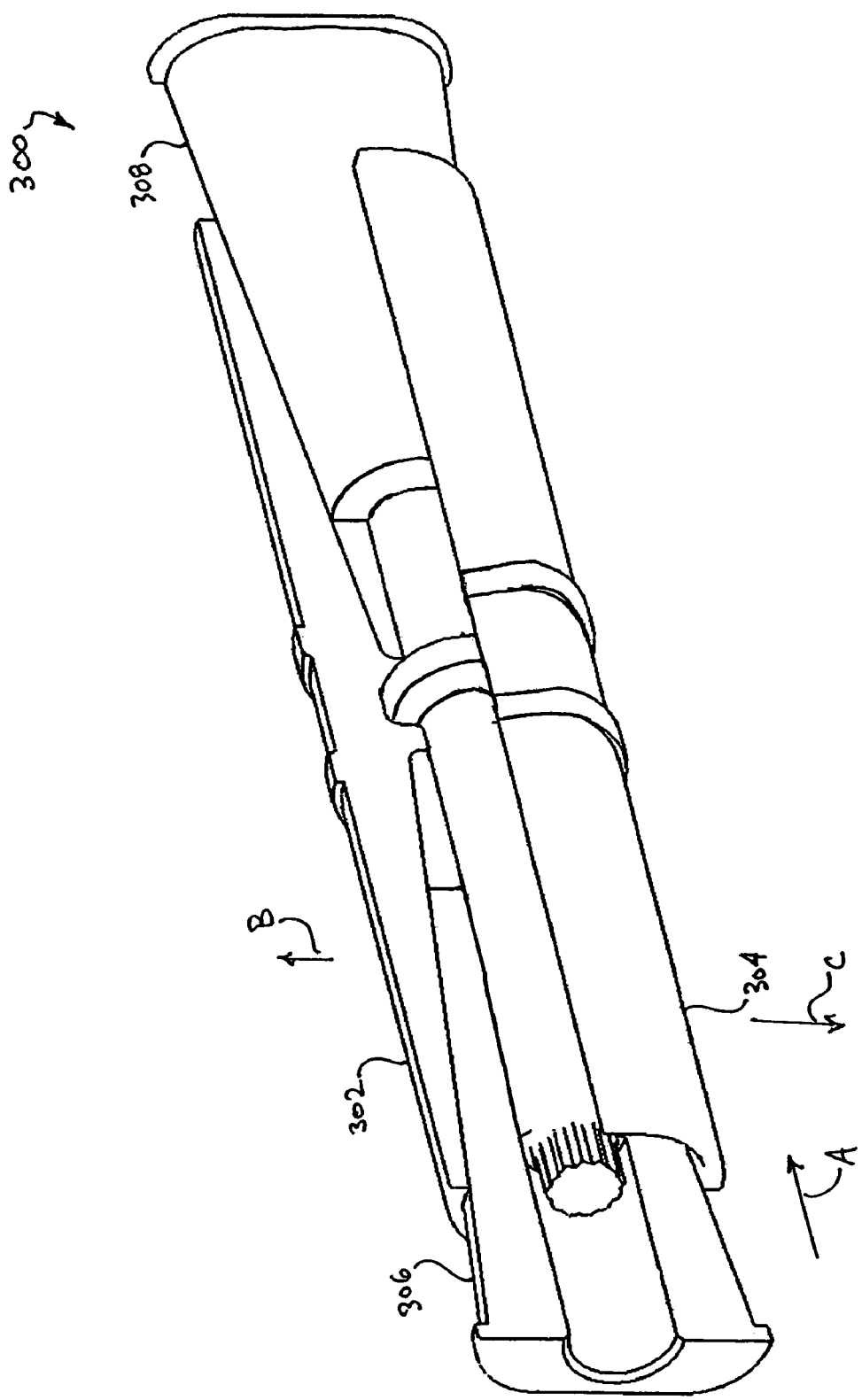

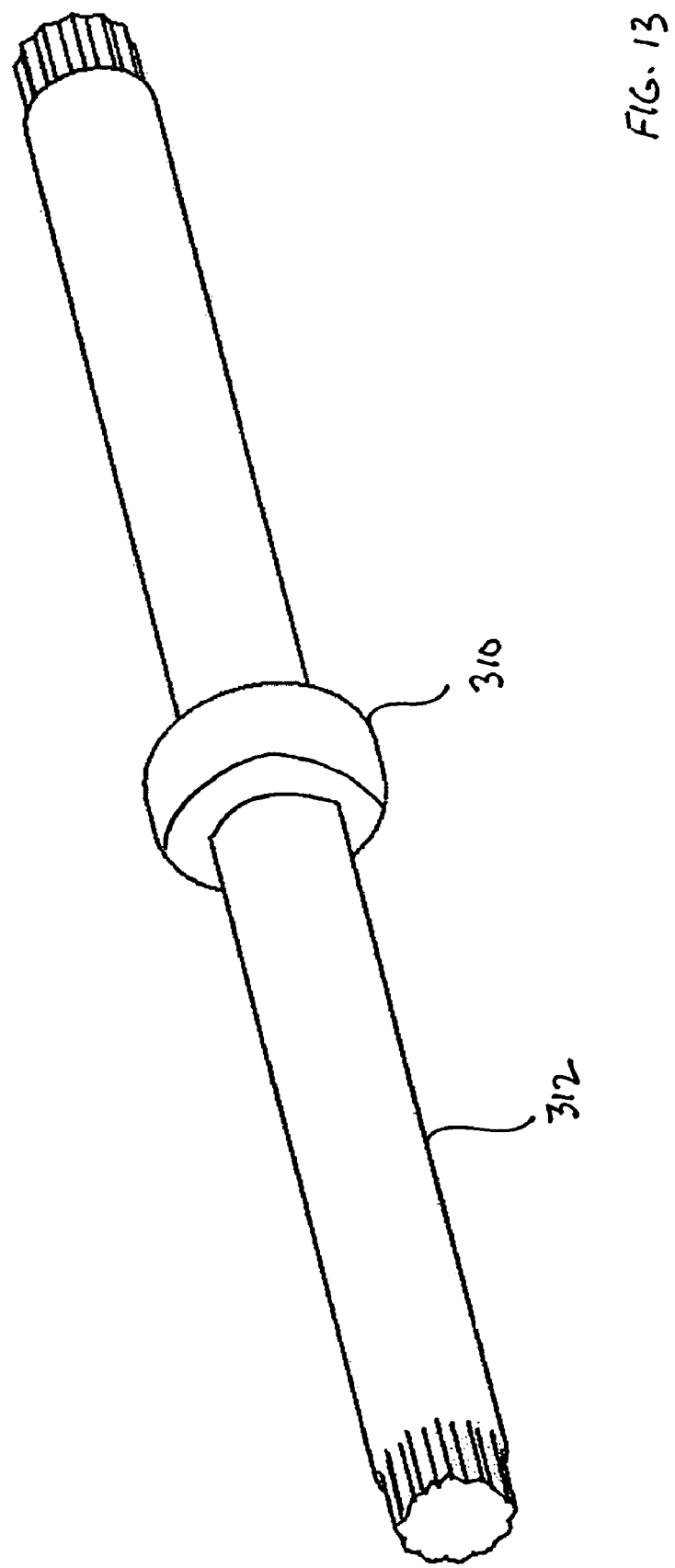

VARIABLE PITCH ROTOR BLADE WITH DOUBLE FLEXIBLE RETENTION ELEMENTS

CROSS REFERENCE TO RELATED APPLICATION

This application claims the benefits of U.S. Provisional Patent Application Ser. No. 60/651,089, filed on Feb. 7, 2005, the contents of which are incorporated herein by reference in their entirety.

TECHNICAL FIELD

This invention relates in general to rotor blades and, more particularly, to rotor blades for propulsive thrust devices in aircraft engines in which the rotor blades can be varied in pitch to control thrust-producing and/or power-absorbing capacities of such devices.

BACKGROUND OF THE INVENTION

Standard configurations of rotor blades typically used in aircraft rotary propulsion systems that allow variable pitch operation usually include a root attachment mechanism such as a ball/roller bearing and/or flex member, both of which allow pitch change of the blade with relatively low friction between components. To impart the necessary structural integrity to such mechanisms (e.g., to accommodate the substantial centrifugal forces exerted on the mechanisms during operation), they are often fabricated in such a way so as to be extremely heavy. A further complication is that substantial centrifugal loads on the plate-like structures of the blades themselves also produce significant twisting or turning forces that pitch control systems must overcome. These forces tend to turn the blade towards an undesirable flat pitch position. In the event that a malfunction of the pitch control system occurs, the forces acting on the blades could turn the blades to the flat pitch position, reducing rotor rotational resistance, thereby resulting in rotor overspeed conditions and potential blade loss.

As stated above, the turning force that acts on a rotor blade during its normal operation is substantial. In propulsion technology as it applies to fans and propellers, this force is referred to as the total twisting moment (TTM). The TTM is the net sum of three basic forces, viz., the centrifugal twisting moment (CTM), the aerodynamic twisting moment (ATM), and the frictional twisting moment (FTM). The CTM, which is typically the most substantial of the forces, originates from a non-symmetrical mass distribution of an airfoil of a rotor blade about a pitch change axis of the airfoil. In other words, in an oblong airfoil having a non-circular, non-symmetrical cross section, the mass about the pitch change axis is not evenly distributed, and centrifugal forces originating from the rotor's axis of revolution and acting on elements of the airfoil cause inertial twisting forces. The ATM is caused when the effective center of pressure on each section of an airfoil of a rotor blade is forward or aft of the pitch change axis. The FTM resists turning motion and develops in retention bearings that support the rotor blade due to high centrifugal loads acting on the bearings. In the operation of a rotor blade in which all three forces are taken into account, the CTM acts to turn a rotor blade toward low pitch, but because the aerodynamic center of pressure of an airfoil is usually forward of the pitch change axis, the ATM opposes and counters the CTM to turn the rotor blade toward an increased blade pitch. The FTM, which is caused by friction, opposes blade pitch change in either direction.

The forces of the pitch control system required to overcome the forces acting on the rotor blade during its operation can be appreciable. With TTM being dominated by CTM, the pitch control system of a typical rotor blade device exerts a torsional load in the direction of increased pitch to hold the blade pitch constant. The system must also exert an additional force to overcome the FTM in order to increase the blade pitch. However, if there is a malfunction and/or loss of control of the pitch control system (e.g., due to loss of engine power), a rotor blade will naturally turn toward lower pitch. Because low pitch results in less rotational resistance for the engine, the situation can result in an undesirable overspeed of the rotor and engine. In extreme conditions in variable pitch systems with no low pitch stop, the TTM can turn the blades to low pitch, and rotor thrust can suddenly switch to a high drag force that can cause possible loss of aircraft control and/or result in rotor overspeed. Rotor overspeed is more likely if the rotor is driven by a turbine engine rather than a piston engine, especially if that segment of the turbine that powers the rotor is separate from other turbine components. This turbine is referred to as a "free" turbine (i.e., there is no revolution limiting capability). In a single engine aircraft, increased drag can limit glide distance for an unplanned landing, while in a twin engine configuration, the asymmetric drag of one disabled propulsor can hinder the ability of the pilot to control the aircraft.

To prevent undesirable pitch tendencies, counterweights have been added to the sides of rotor blades and at or proximate the root ends of the rotor blades. Such weights are typically of sufficient mass to create a net TTM that will be able to overcome all inherent rotor blade turning forces and drive the rotor blades toward higher pitch (or at least maintain the pitch setting to prevent movement toward lower pitch). These weights have also been known to be substantial in mass, thereby adding unsprung weight to the rotor blades and further loading the bearings associated with the rotor hub and blade retention mechanisms. Also, these weights often have associated retention mechanisms or other devices that may be prone to failure under normal operating conditions due to the mechanical stresses encountered. If a failure is experienced, the high energy of the released mass may result in impact damage as well as high rotor unbalance conditions. Other pitch control systems typically employ auxiliary electric pumps that provide backup pressure for a hydraulic system, linear ACME thread harmonic drives, and/or latching devices that hold position. In at least some of these systems, if the pitch of the rotor blades is maintained in a less than optimum position for gliding (in an aircraft having a single engine configuration) or for compromised operation (in an aircraft having a twin engine configuration), increased drag forces may be generated which inhibit the ability of an operator to properly manage the system.

Based on the foregoing, what is needed is a device for efficiently and controllably varying the pitch of a rotor blade in an aircraft propulsion device. Also, what is needed is a rotor blade for an aircraft propulsion device that is capable of being efficiently and controllably varied.

SUMMARY OF THE INVENTION

According to one aspect, the present invention resides in a propulsive thrust device for an engine. Propulsive thrust devices that are within the scope of the present invention include, but are not limited to, fans and turbo-fans for use in jet aircraft engines, ducted fans driven by shafts or gearboxes, propellers for use with rotary piston aircraft engines, rotors or fans for use in helicopters or other vertical/short take-off and landing aircraft, and the like. Such devices include a rotor blade and a hub assembly on which the rotor blade is mounted. The rotor blade comprises an airfoil, a first support member depending from a forward portion of the airfoil, and a second support member depending from an aft portion of the airfoil. The hub assembly comprises either a single spool to which both support members are attached or a first spool on which the first support member is attached and a second spool on which the second support member is attached. If two spools are utilized, the second spool is coaxially aligned with the first spool. A collector ring is coaxially aligned with and rotatable relative to the hub and may be supported with a bearing mechanism attached thereto. The rotor blade has a platform at the root of the airfoil that includes a lever arm extended some distance from the pivot center and mechanically connected to the collector ring. This arm is positionable relative to the hub via rotation of the collector ring to allow the pitch of the rotor blade to be varied. The fan assembly itself is rotatable about a centerline axis extending longitudinally therethrough to produce thrust as a propulsion system.

According to a second aspect, the present invention resides in a propeller thrust device that includes a rotor blade, a central hub at which the rotor blade centrifugal load is supported, and an outer hub supporting a control mechanism mechanically connected to the rotor blade and controllable to vary the pitch of the rotor blade on the central hub. The rotor blade comprises an airfoil having a hollow root, a first support member flexibly attached to a forward portion of the airfoil and depending through the hollow root, and a second support member flexibly attached to an aft surface of the airfoil and also depending through the hollow root. The rotor blade is attached to the central hub at the first and second support members and is guided for pitch angle turning by a bushing or sealed rotary ball or roller bearing in a mating hole through the arm of the outer hub.

In a third aspect, the present invention resides in a rotor blade for an aircraft engine or in a separate ducted fan housing driven by a powered shaft or gearbox output shaft. The rotor blade includes an airfoil and first and second support members attached to the airfoil. Both the first and second support members are attachable to a rotatable hub and movable relative to the rotatable hub to allow pitch of the rotor blade to be varied. An extended arm or portion of the structure and/or flow path at the root of the airfoil of each blade is attached to a controllable mechanism that can vary the pitch of all blades simultaneously.

In any of the disclosed embodiments, the pitch of the rotor blade may be varied controllably, or the pitch may be allowed to change in response to operational conditions of an aircraft in which the rotor blade is utilized.

One advantage of the present invention is that the thrust-producing and/or power-absorbing capacity of a propulsive device is more easily controlled because dual support of the rotor blade helps balance high CTM forces. The reduction derives from alignment of the blade mass elements from the forward and aft portions of the airfoil with each respective support member, and/or the positioning of the attachment points of these members to create a desirable restoring, twisting force when centrifugal load is applied. In general, these support members tend to follow an extension of the natural cumulative twist built into each airfoil required to align airfoil sections with local airflow vectors along the length of the blade. Changes in rotor operating conditions (e.g., variations in air velocity entering the rotor, the level of power applied to the rotor, and the like) can be compensated for or controlled to limit drastic responses of the device. For example, a rotor propelling an aircraft can experience or require significant changes in velocity and operating power between static thrust operations, take-offs, climbs, cruise conditions, and descent conditions. By varying the pitch of the rotor blades accordingly, efficiency (e.g., fuel economy) and responsiveness of the device can be realized.

A primary advantage for propellers is that high blade centrifugal forces can be efficiently supported by a much smaller, compact, central inner hub. The outer hub is thus lightly loaded, supporting mainly the blade bending and thrust loads while providing a pivot center about which the blade can turn when changes in pitch are commanded by the pitch control system. As such the outer hub can be constructed as a thin, lightweight structure of various low cost materials.

Another advantage for both propellers and fan applications is that the need for a counterweight on each blade as a pitch control backup system is eliminated. Without the counterweights, additional loading of the rotor hub and bearings is eliminated, thereby reducing the size and amount of wear to the device. Furthermore, without a counterweight, the risk of failure of the associated retention mechanisms is eliminated, which in turn removes the possibility of impact damage resulting therefrom as well as rotor unbalance conditions.

Still another advantage for both propellers and fans is that a structurally efficient means of blade attachment is realized. Blade attachment using this means is especially well-suited to the design and fabrication of thin, efficient, lightweight, composite rotor blades.

Still another advantage for fan designs is derived from the calculated frangibility of a post and/or mating receptacle on which the rotor blade pivots. By being calculated to fail under excessive loading from blade impact with foreign objects (e.g., from the development of abnormally large loads such as from the ingestion of birds, runway debris, or other foreign objects), the blade is allowed to swing more freely without fracture of the support members. Thus blade loss and extreme unbalance conditions may be mitigated.

BRIEF DESCRIPTION OF THE DRAWINGS

FIG. 11 is a perspective view of a pin used to preload a rotor blade of the propeller application of FIG. 7.

FIG. 12 is a perspective cutaway view of the pin of FIG. 11.

FIG. 13 is a perspective view of a rod of the pin of FIG. 11.

DETAILED DESCRIPTION OF THE PREFERRED EMBODIMENTS

The present invention utilizes a configuration of associated independently controllable support members to vary the positions of rotor blades. Although only two support members are shown for each rotor blade, it should be understood that any number of support members may be used to control a rotor blade. In propulsive thrust devices, the positions of the rotor blades are variable primarily to optimize the angular orientation of part or all of the airfoil surface relative to local air flow direction(s) along the length of a rotor blade developing propulsive thrust. Because the air flow direction changes with operating condition, adjustment of blade pitch angle can provide significant increases in propulsive efficiency resulting in greater fuel economy. Although the propulsive thrust devices referred to herein are referred to as aircraft engines, it should be understood that any type of device having a rotating blade is within the scope of the present invention.

Figure 1:
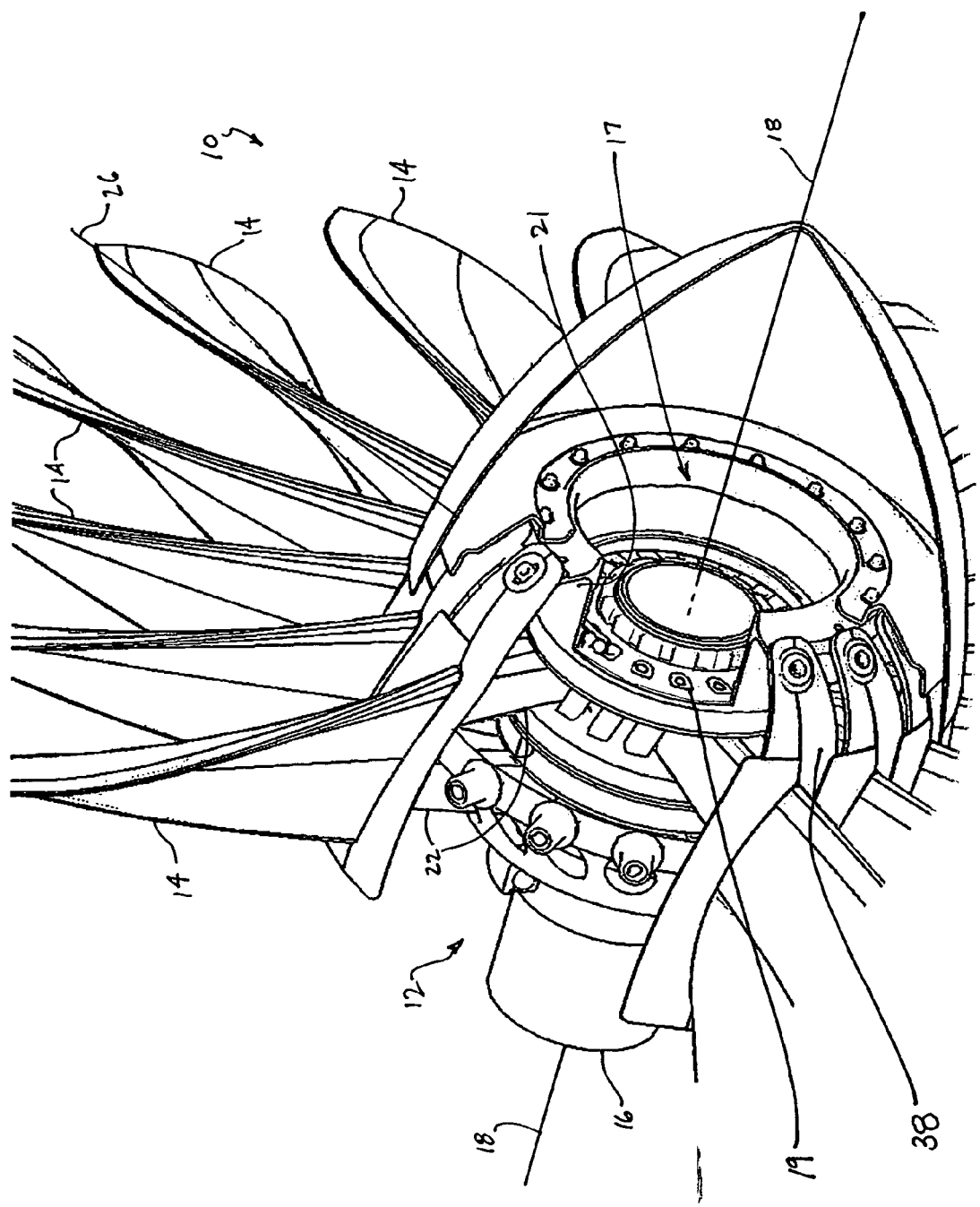
FIG. 1 is a perspective cutaway view of a fan, of the present invention, in which a rotor blade is mounted on a hub and is pivotable on the hub via a rotatable collector ring to provide variable pitch to the rotor blade.

Referring to FIG. 1, one exemplary embodiment of a fan for an aircraft engine is shown generally at 10. The fan 10 is preferably for a turbofan engine, although the present invention is not limited in this regard and other types of airfoil devices (e.g., propellers, helicopter rotors, and the like) can be easily adapted to the principles described herein and are within the scope of this disclosure. Fan 10 comprises a hub 12 and a plurality of rotor blades 14 mounted on the hub. The hub 12 is symmetrically mounted on a fan shaft 16 that is coincident with a hub centerline axis 18 about which the fan rotates. The rotor blades 14 are each attached to the hub assembly 12 via two members 22. When mounted, the rotor blades 14 each extend radially outwardly from the hub 12 along a rotor blade axis 26.

The root end of each blade's airfoil is enveloped with a contoured shape, referred to as a platform that describes and/or provides closure or sealing of the inner flow path of the air being compressed or accelerated by the fan. This may consist of one piece which is integral with the blade or two separate pieces that can be clamped around the junction of the root support members to the blade's airfoil. The junction between the platform and the blade proper may be accomplished with a potted semi-flexible material such as silicone rubber and/or a polyurethane compound to allow flexure at the junction without loss of joint integrity. By extending sufficiently outward from both sides of each blade, these platforms overlap one another to form a seal for the inner flow path of the air between blades. The overlapping edges of these platforms can be made thin and flexible to allow limited turning of each blade, yet be preloaded enough against each other as to always stay in contact. In so doing, these platforms can be made to also dampen blade vibration. Also, the central region of the platform can be molded or shaped into a receptacle for receiving the pivot post or bushing or bearing which defines the blade's pitch change axis. Furthermore, the forward end of this platform can be extended to provide a mechanical advantage in the form of a lever arm with a small slot for controlling pitch of the blade. This slot in each rotor blade 14 mates with a roller bushing on a collector ring 17, which is coaxially aligned with and adjacent the hub 12. Although the platform lever arm and collector ring 17 are shown positioned forward of the hub 12, the present invention is not limited in this regard as the lever and collector ring may be positioned aft of the hub, or dual levers and rings can be positioned both forward and aft of the hub.

Central bearing posts 30 are positioned adjacent the hub 12, each post optionally providing support to its respective rotor blade 14 intermediate the two members 22 and allowing for the pivotal movement of the rotor blade about the rotor blade axis 26. The posts 30 may be threaded to facilitate the preloading of the rotor blades 14 and any associated bearing structure in an outwardly radial direction during assembly of the fan 10. Additionally, the posts 30 may be sufficiently strong to support normal operating loads but purposely fabricated to be sufficiently frangible to fail under excessive loading. Additionally or alternatively, the mating receptacle at the center region of the blade root platform can be made frangible.

The collector ring 17 is supported on the hub 12 by a bearing 19 and may have a rib 21 that projects radially outwardly from an outer surface of the ring. Roller bearings attached to the ring mate with slots in blade platform lever arms at the front of each rotor blade 14. Slots in each rotor blade 14 lever arm interface with rollers on the rib 21 (e.g., at the lever arm 38). Any suitable mechanism may be utilized to rotate the collector ring 17 to vary the pitch of the rotor blade 14. Preferably, the collector ring 17 is rotated via a harmonic drive device, although other devices are within the scope of the invention. During an operation in which the pitch is varied, the rotation of the collector ring 17 is sufficient to impart a total turning motion of up to 10 degrees or more in either direction to the platform and airfoil portions of the blade.

To accomplish this rotation, the blade support members are constructed of multiple strands of high strength materials such as carbon, glass, Kevlar, and/or metallic fibers. These fibers are preferably sufficiently strong in tension to support high blade centrifugal forces, yet able to be molded in low modulus resins or compounds to allow sufficient rotational deflection in a short length to provide the pitch change motion preferred. Also, many new materials may become available in the future that will allow such motion and may be substituted for these fibrous supports without departing from the scope of the invention.

Figure 2:
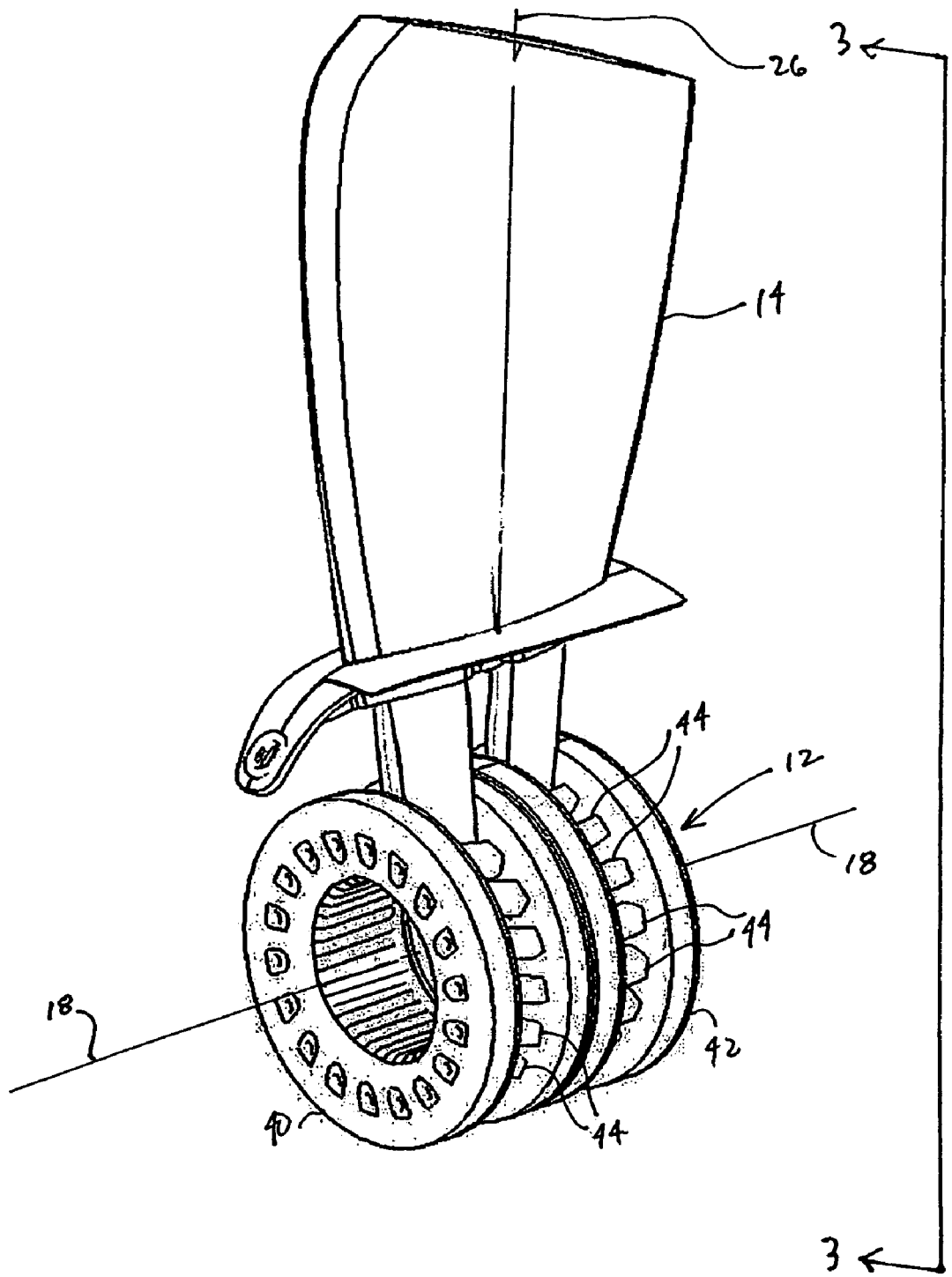
FIG. 2 is a perspective view of a rotor blade, of the present invention, mounted on the hub, of the present invention.
Figure 3:
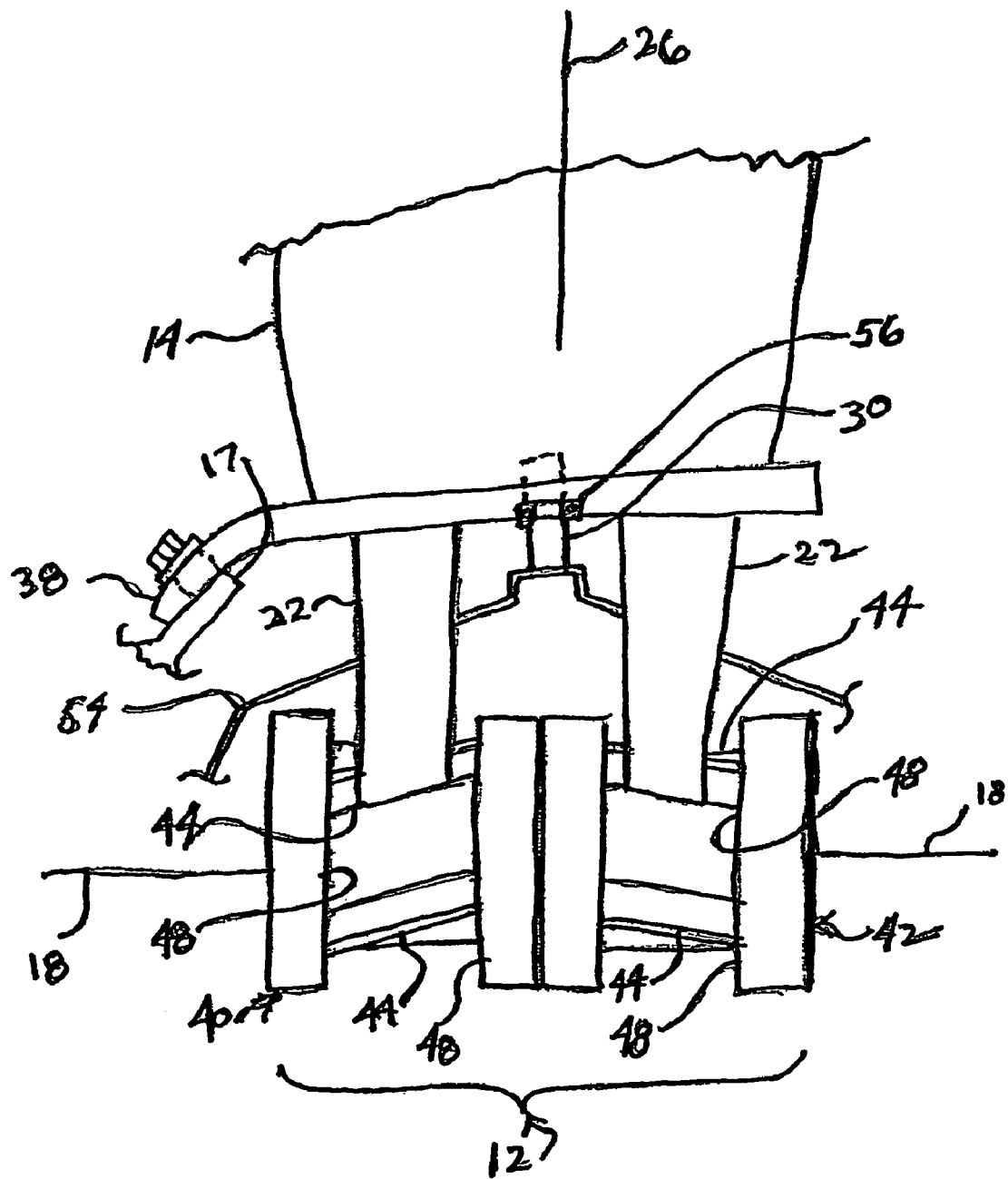
FIG. 3 is a section view of the rotor blade of FIG. 2 mounted on the hub.

Referring now to FIGS. 2 and 3, the rotor blade 14 is mounted on the hub 12. The hub 12 includes a forward spool 40 and an aft spool 42, both being coaxially aligned on the centerline axis 18. The forward spool 40 and the aft spool 42 are preferably cast, forged, or connected so as to define a unitary member. The present invention is not limited in this regard, however, as the forward spool 40 and the aft spool 42 may be distally located from and cooperative with each other. Both the forward spool 40 and the aft spool 42 are fabricated of any suitable material capable of imparting the necessary structural integrity to the hub 12. Exemplary materials from which the spools may be fabricated include, but are not limited to titanium, titanium alloy, carbon fiber, and the like. Preferably, the walls of the spools are titanium with carbon fiber windings to provide hoop strength.

Bars or rods 44 extend from opposing facing surfaces 48 of the end portions of each spool to provide surfaces at which the support members 22 of the rotor blade 14 can be attached. Preferably, the support members 22 include holes through which the rods 44 extend, although the present invention is not limited in this regard as the support members may be attached directly to the rods. The rods 44 extend longitudinally along the length of each spool at an angle relative to the hub centerline axis 18.

The rotor blade 14 may also be at least partially supported and positioned by the post 30 that extends radially outwardly from a blade pivot support 54 that is positioned over the hub 12 and along the rotor blade axis 26 of the rotor blade. The blade pivot support 54 rotates with the hub 12. One post 30 is associated with each rotor blade 14 to provide pivotal movement and thereby variable pitch to the rotor blade. A bearing or bushing 56 is mounted at the point at which the post 30 extends into the rotor blade 14 or mating receptacle in the central portion of the blade platform to reduce the friction generated by rotating the rotor blade on the post to vary the pitch. In some embodiments, the post 30 and/or platform receptacle may be sufficiently strong to support normal operating loads but purposely fabricated to be sufficiently frangible to fail under excessive loading.

When the hub 12 is installed into an engine, the forward spool 40 and the aft spool 42 are rotatable together via the fan shaft. The rotation of the collector ring 17 interfacing with the platform lever arm 38 causes the flexing of the support members 22 and the pivotal movement of the rotor blade 14 about the rotor blade axis 26, which varies the pitch of the rotor blade.

Figure 4:
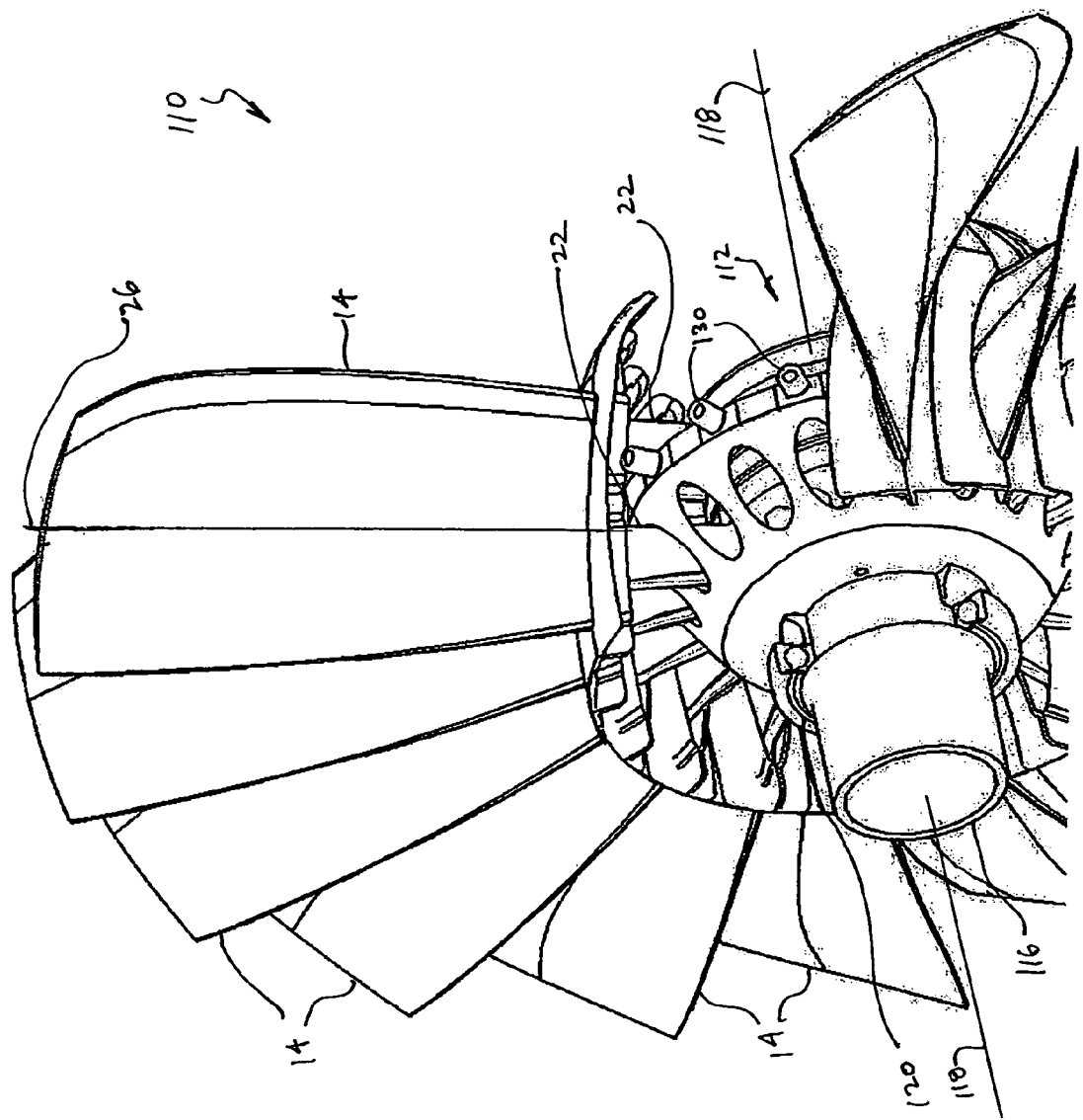
FIG. 4 is a perspective cutaway view of an alternate embodiment of a fan, of the present invention, in which a rotor blade is mounted on an independently rotatable hub assembly capable of providing variable pitch to the rotor blade.

Referring now to FIG. 4, one alternate embodiment of a fan is shown generally at 110. The fan 110, which may be utilized for any type of aircraft, comprises a hub assembly 112 and a plurality of rotor blades 14 mounted thereon. The hub assembly 112 is symmetrically mounted on a fan shaft 116 that is coincident with a hub centerline axis 118 about which the hub assembly rotates. The rotor blades 14 are each attached to the hub assembly 112 via two members 22. As in the previously disclosed embodiment, the rotor blades 14 each extend radially outwardly from the hub assembly 112 along their respective rotor blade axes 26. Central bearing posts 130 are positioned adjacent the hub assembly 112, each post optionally providing support to its respective rotor blade 14 intermediate the two members 22 and allowing for the pivotal movement of the rotor blade about the rotor blade axis 26.

Figure 5:
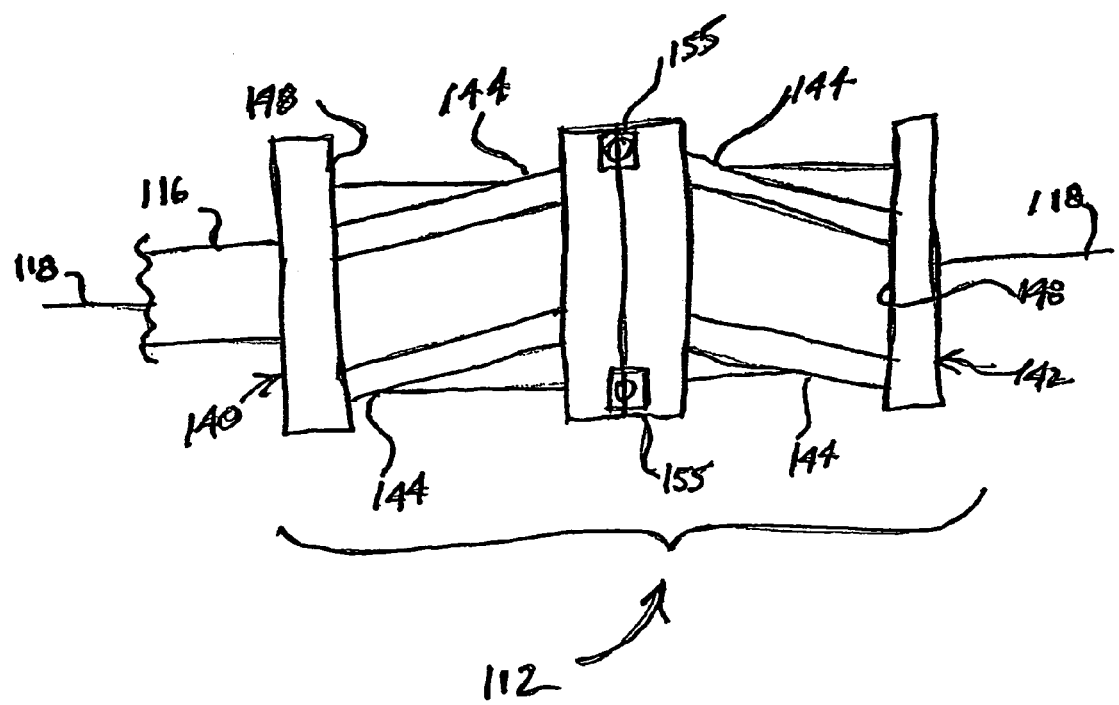
FIG. 5 is a section view of the independently rotatable hub assembly of FIG. 4.

Referring now to FIG. 5, the hub assembly 112 comprises two independently rotatable coaxially aligned spools, viz., a forward spool 140 and an aft spool 142, that are rotatable on the fan shaft 116. A bearing 155 separates the forward spool 140 from the aft spool 142, although the present invention is not limited in this regard as the two spools may be distally located from each other. Rods 144 extend between opposing facing surfaces 148 of each spool to provide attachment points for the support members.

Referring to FIGS. 4 and 5, when the hub assembly 112 is installed into an engine, the forward spool 140 and the aft spool 142 are rotatable together via the fan shaft 116. The independent rotation of the forward spool 140 and the aft spool 142 may be effected by gearing (not shown) operably associated with each spool and the fan shaft 116, although the present invention is not limited in this regard and other means of independently causing relative rotation of the spools are within the scope of the present invention. In any embodiment, the independent rotational positioning of the forward spool 140 relative to the aft spool 142 causes the pivotal movement of the rotor blade 14 about the rotor blade axis 26, which varies the pitch of the rotor blade.

Figure 6:
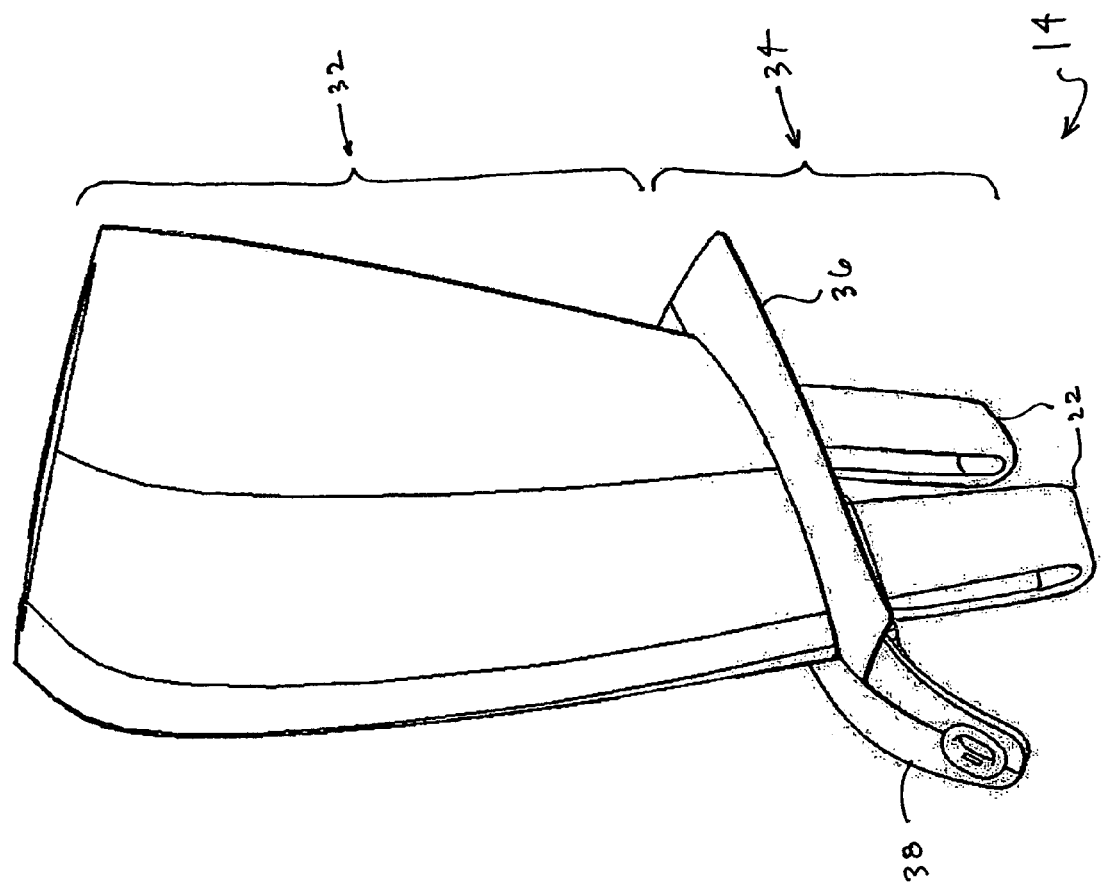
FIG. 6 is a perspective view of a rotor blade, of the present invention.
Figure 7:
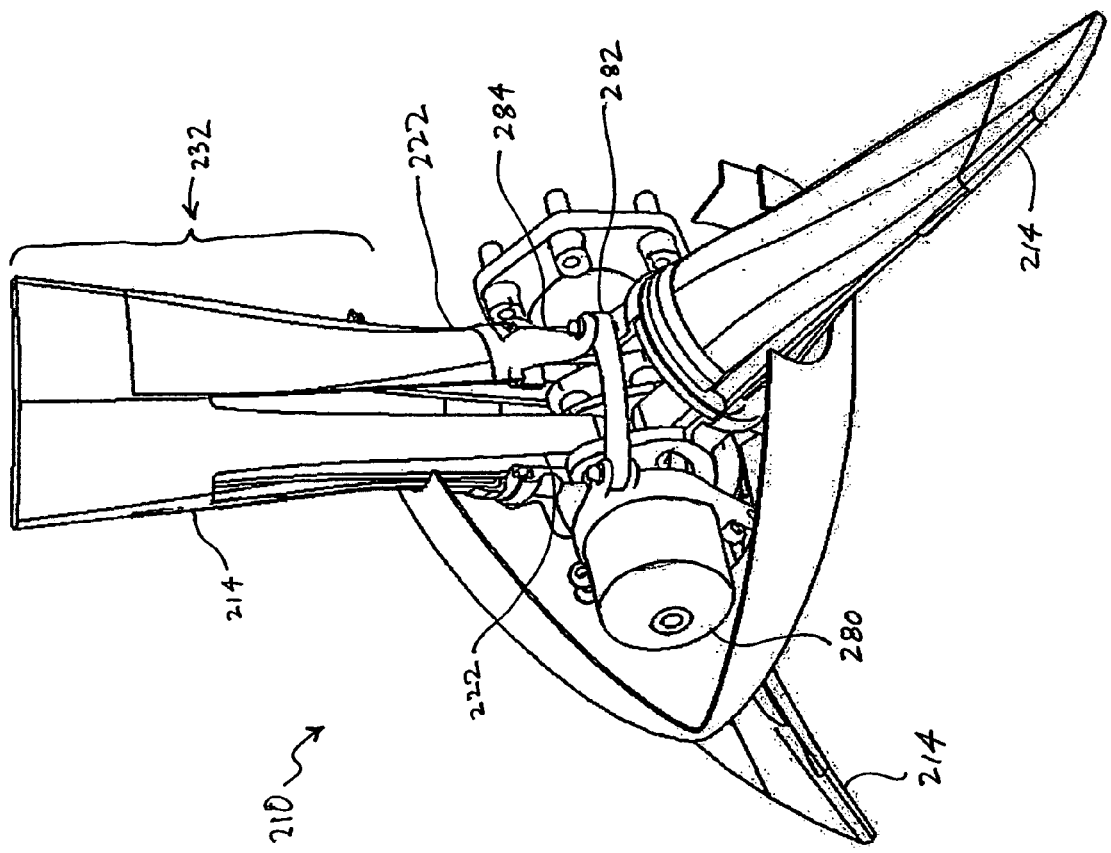
FIG. 7 is a cutaway view of a propeller application in which a rotor blade is mounted on a central hub within an outer hub having a pitch control mechanism capable of providing variable pitch to the rotor blade, of the present invention.

Referring now to FIG. 6, one exemplary embodiment of the rotor blade 14 of the present invention for use with the embodiments described herein includes an airfoil portion 32 and a root portion 34. The airfoil portion 32 can be solid, semi-solid, or hollow and of any suitable configuration and material. Preferably, the airfoil portion 32 is hollow or this hollow portion may be filled with a suitable lightweight material such as foam or honeycomb, and fabricated from a thin, lightweight, composite material that facilitates an efficient operation of a fan in which the rotor blade 14 is installed. The airfoil portion 32 is attached to the root portion 34 at an upper surface of a platform 36 of the root portion. The platform lever arm 38 extends from the platform 36 to provide a point at which the rotor blade 14 can interface with roller bearings on the collector ring or other surface to control pitch as well as to perhaps provide additional support for the rotor blade.

In any embodiment, the two support members 22 extend from a lower surface of the platform 36 and are of sufficient length and inherent flexibility to permit a desired amount of angular rotation of the rotor blade 14 relative to the hub assembly. The support members 22 may be straps, tenons, torque tubes, cables, tangs, links, or linkage members. The points at which the support members 22 are attached to the lower surface of the platform 36 are selected to allow the rotor blade 14 to perform optimally under adverse conditions, for example, by allowing the rotor blade to achieve a desired pitch angle setting for a given operating condition. The selection of the attachment points is such that the total twisting moment, which is affected by high centrifugal tension loads, acts upon the rotor blade 14 via the two support members 22 to maintain the balance of the rotor blade or to cause it to deflect or otherwise move to a more desirable angular setting in the event of a loss of pitch control or loss of power. These points of attachment as well as the desired angular settings are determined by suitable analysis methods (e.g., computer modeling) and verified by test procedures.

One exemplary embodiment of a propeller application for a rotor blade 214 of the present invention is shown in FIGS. 7-10. Such a rotor blade 214 is especially suited for propeller applications (shown at 210 in FIG. 8), which typically involve blade pitch angle ranges that are substantially greater than those for fan applications. In the propeller 210 or similar propeller applications such as helicopter main rotors or tail rotors, the rotor blade 214 includes an airfoil portion 232 having a hollow root to provide adequate internal space for longer support members 222.

Figure 8:
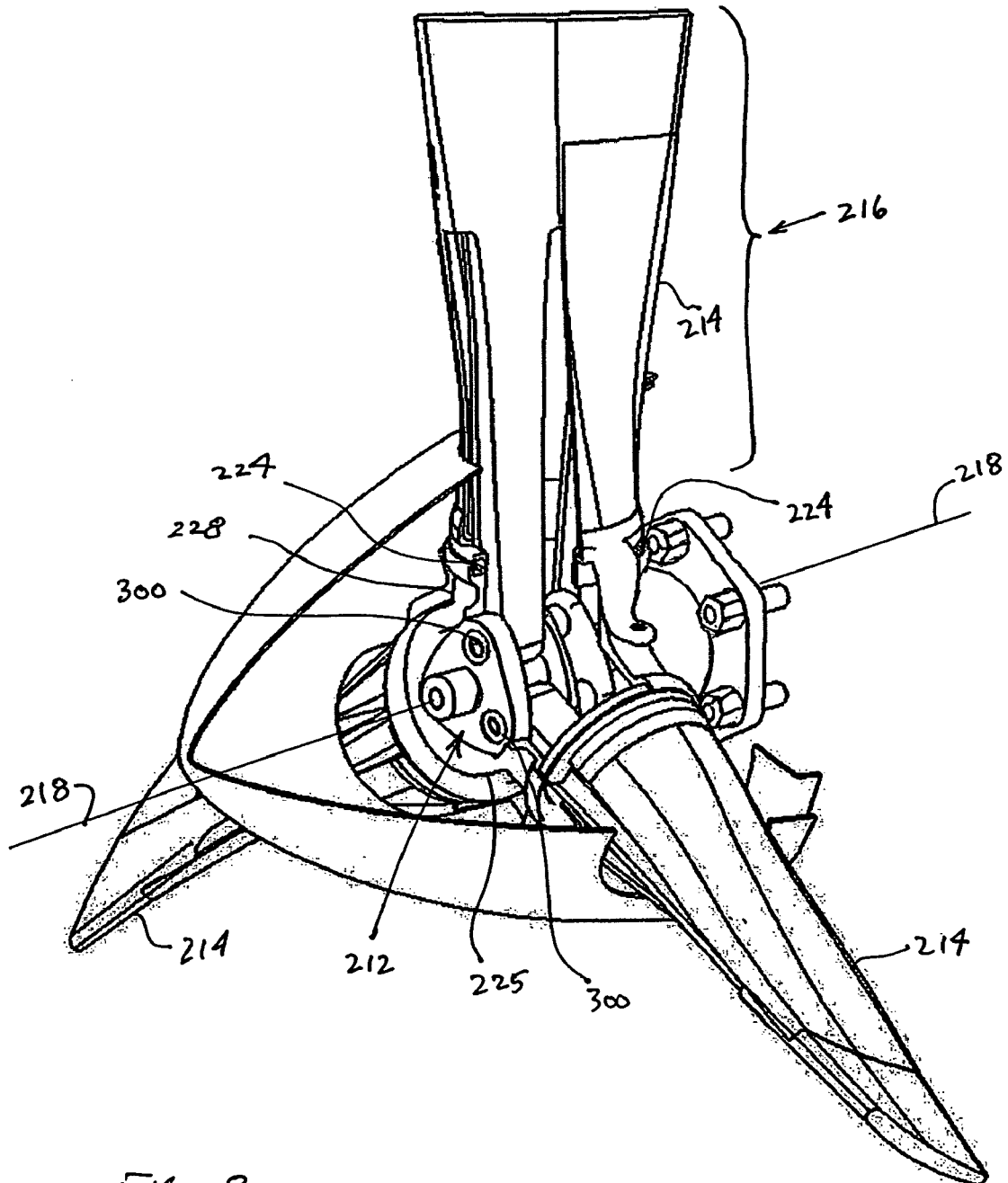
FIG. 8 is a perspective cutaway view of the propeller application showing the mounting of the rotor blades on the hubs.

Referring now to FIG. 8, the rotor blade 214 is mounted in a compact central hub 212 using pins 300 that extend through the central hub parallel or angled to a centerline axis 218. The compact central hub 212 supports the large centrifugal loads generated by the rotor blades 214. An outer hub 225 is positioned around the central hub 212. Because the outer hub 225 does not need to support large centrifugal forces, it may be fabricated thin from any suitable lightweight material including, but not limited to, aluminum, aluminum alloys, carbon fiber composite materials, combinations of the foregoing, and the like. A sealed bearing 224 with rolling elements (e.g., balls or rollers) reduces friction between the root of the airfoil portion 232 and each arm 228 of the outer hub 225. The sealed bearing is in compression because the support members of the blade are pre-tensioned at assembly to pre-dispose the blade to turn to a desired low pitch angle to prevent overspeed under all loading conditions, even when loss of pitch control occurs.

Referring back to FIG. 7, the pitch of each rotor blade 214 is controlled via a pitch control mechanism 280 through a link 282 that is attached to a control arm 284. The pitch control mechanism 280 can be adjusted mechanically to adjust the pitch angles of all the rotor blades 214 simultaneously. In propeller 210 (or a similar propeller applications) the points at which the support members 222 attach to the central hub 212 are selected to allow the rotor blade 214 to deflect or otherwise move to a high pitch angle if the pitch control (which is usually hydraulically driven with oil pressure generated by a pump that is dependent on engine rotation) is compromised or lost altogether. By configuring the rotor blades 214 and the attachment angle/position of the support members in such a way as to increase the pitch thereof in the event of a loss of control, less drag is experienced on the aircraft and the tendency for causing an overspeed condition is reduced.

Figure 9:
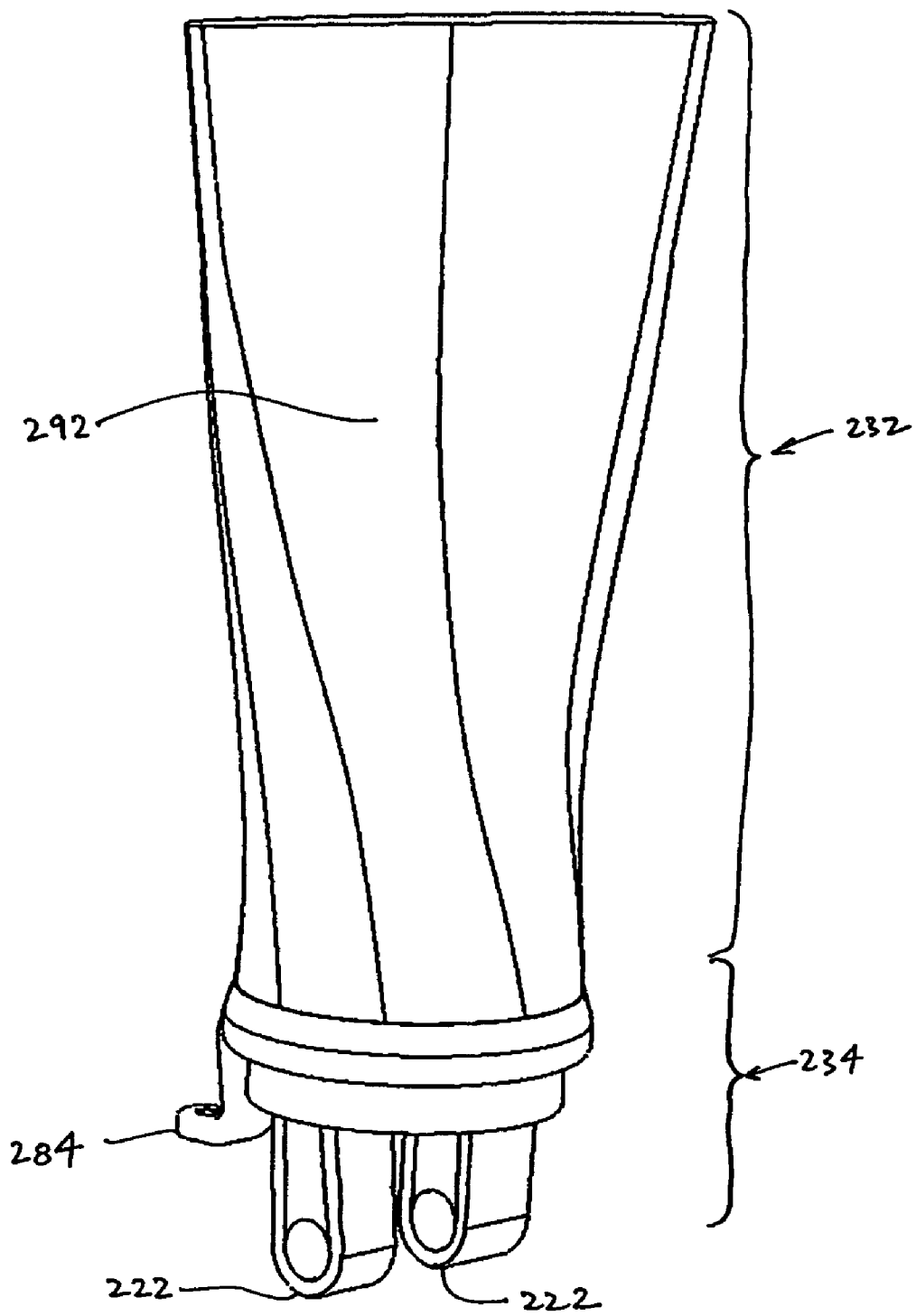
FIG. 9 is a perspective view of a portion of the airfoil pressure surface and root attachment members of a rotor blade of the propeller application of FIG. 7.
Figure 10:
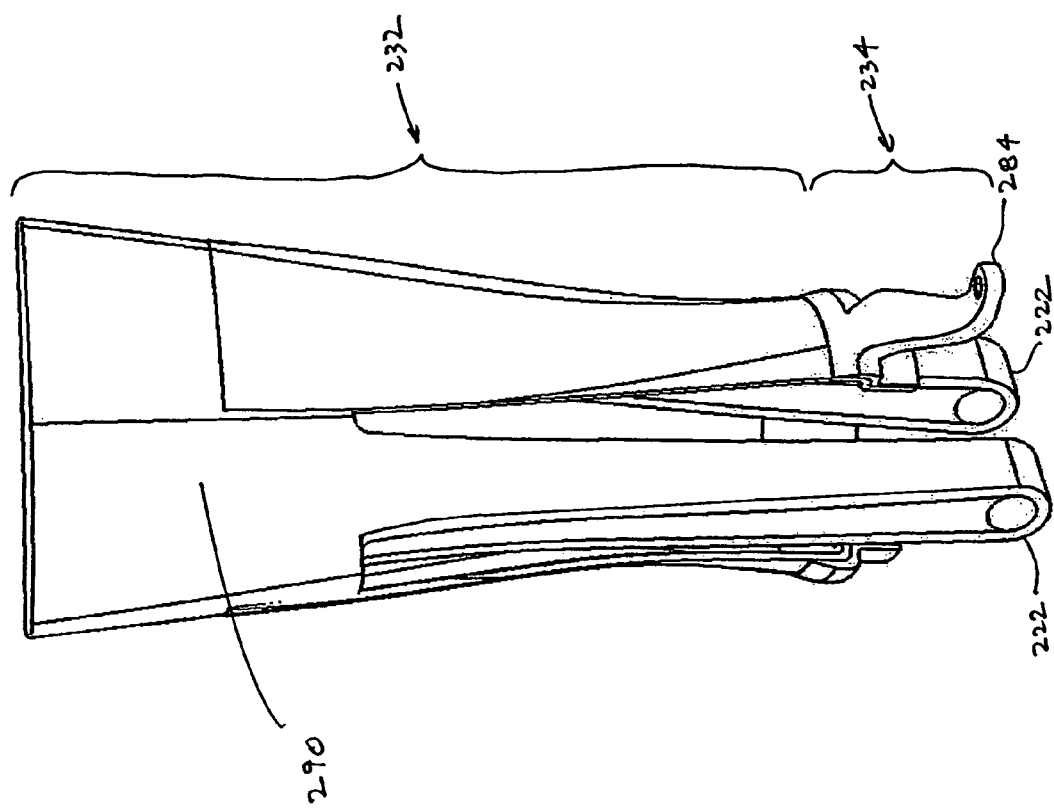
FIG. 10 is a perspective cutaway view of a portion of the suction surface and root attachment members of a rotor blade of the propeller application of FIG. 7.

Referring specifically to FIGS. 9 and 10, the rotor blade 214 includes the airfoil portion 232 (only a portion of the full blade is shown) and a hollow root portion 234 with the two support members 222 integrally formed with or otherwise attached to an outer surface (290 in FIG. 10) of the airfoil portion and extending inward through the hollow root portion. As can be best seen in FIG. 10, the support members 222 each extend up a length of the inside surface 290 and attach thereto at points substantially distal from the lower end of the rotor blade 214. The specific distances from the lower end of the rotor blade 214 at which the support members 222 attach are selected to impart a desirable amount of flexibility to the airfoil portion relative a hub assembly to which the rotor blade is attached. The control arm 284 extends from the root portion 234 to provide a point at which the pitch of the rotor blade 214 can be adjusted using the pitch control mechanism. The outer shell over the hollow inboard part of the blade is purposely built of torsionally stiff material(s) such that a torsional pitch control force applied to the lever arm at the base will be properly transferred to the outer airfoil such that it responds in unison with the base. As can be best seen in FIG. 9, a pressure surface 292 of the rotor blade 114 is substantially uninterrupted to facilitate a less turbulent intake of air by a propeller into which the rotor blade 214 is incorporated.

Referring now to FIGS. 11-13, each of the pins 300 includes two associated shells, viz., a first shell 302 and a second shell 304, and two wedges, viz., a first wedge 306 and a second wedge 308, received between the two associated shells. The first shell 302 and the second shell 304 are each attached to a collar 310 which is integral with a threaded rod 312 and positioned substantially at the center of the rod. Each end of the rod is threaded in opposing directions, i.e. one end has a right-hand thread and one end has a left-hand thread. The wedges are each tapered to one respective end thereof such that when the first wedge 306 is received over the rod 312 from a first end and the second wedge 308 is received over the rod from a second end such that the tapered portions thereof face each other, turning the rod axially in one direction (e.g., using a wrench) causes the wedges to translate towards the central collar 310. Likewise, turning the rod in the opposite direction causes the wedges to move apart from the center.

Referring specifically to FIG. 12, upon rotating the rod 312 through the wedges 306 and 308, the wedge on each end of the rod being translated toward the collar (arrow A). The taper of the wedges drives the first shell 302 and the second shell 304 in opposite directions, as indicated by arrow B and arrow C, thereby allowing the shells to tighten to a lesser tolerance. When the rod 312 is turned axially in an opposing direction, the wedges are translated away from the collar 310, and they withdraw, thereby allowing the first shell 302 and the second shell 304 to relax to a greater tolerance. The optimum adjustment for the pin 300 is one in which the tolerances on each end of the pin are the same or at least within a specified range.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A propulsive thrust device for an engine, said device comprising:
   a rotor blade comprising,
      an airfoil,
      a first support member depending from a forward portion of said airfoil, and
      a second support member depending from an aft portion of said airfoil;
   a hub on which said rotor blade is mounted;
   a collector ring coaxially aligned with said hub and operably communicable with a slot in said rotor blade;
   wherein said rotor blade is positionable relative to said hub via rotation of said collector ring to vary a pitch of said rotor blade; and
   wherein said hub is rotatable about a centerline axis extending longitudinally therethrough.

2. The propulsive device of claim 1, wherein said first support member and said second support member are flexibly attached to said airfoil.

3. The propulsive thrust device of claim 1, wherein said hub comprises a first spool on which said first support member is attached and a second spool on which said second support member is attached, each of said first spool and said second spool being coaxially aligned and including rods at which said first support member and said second support member are respectively attached.

4. The propulsive thrust device of claim 3, wherein said first spool and said second spool are independently rotationally positionable from each other to vary said pitch of said rotor blade.

5. The propulsive thrust device of claim 1, further comprising a post that engages a root of said airfoil, said rotor blade being pivotable about said post along a rotor blade axis extending longitudinally through said airfoil.

6. The propulsive thrust device of claim 5, wherein said post extends from a blade pivot support mounted over said hub.

7. The propulsive thrust device of claim 5, further comprising a bearing associated with said post on which said rotor blade is pivotable.

8. The propulsive thrust device of claim 5, wherein said post engages said root at a point intermediate the points from which said first support member and said second support member depend from said root.

9. The propulsive thrust device of claim 1, wherein said hub is fabricated at least in part from a material selected from the group consisting of titanium, titanium alloy, carbon fiber, and combinations of the foregoing.

10. A propeller thrust device, comprising:
    a rotor blade comprising,
       an airfoil having a hollow root,
       a first support member flexibly attached to a forward surface of said airfoil and depending through said hollow root, and
       a second support member flexibly attached to an aft surface of said airfoil and depending through said hollow root;
    a central hub at which said first support member and said second support member are attached;
    an outer hub having a bearing for supporting said rotor blade and for guiding turning of said rotor blade for pitch angle adjustment; and a control mechanism mechanically connected to said rotor blade and controllable to adjust the pitch angle of said rotor blade on said central hub.

11. The propeller thrust device of claim 10, wherein said first support member and said second support member are attached to said central hub with a pin that extends through said central hub along a centerline axis of said central hub.

12. The propeller thrust device of claim 11, wherein said pin comprises, a first shell, an opposingly-positioned second shell, a first wedge positioned between said first shell and said second shell, and a second wedge positioned between said first shell and said second shell, wherein tapered portions of said first wedge and said second wedge face each other and wherein said wedges are translatable within said first shell and said second shell to urge said first shell and said second shell in opposing directions.

13. The propeller thrust device of claim 12, wherein said first wedge and said second wedge are translatable within said first shell and said second shell along a rod.

14. The propeller thrust device of claim 10, wherein said control mechanism is connected to a control arm of said rotor blade using a link.

15. The propeller thrust device of claim 10, wherein said root of said airfoil is rotatable on an arm of said central hub.

16. The propeller thrust device of claim 15, wherein said root of said airfoil is rotatable on said arm of said central hub via a sealed bearing.

17. A rotor blade for an aircraft engine, said rotor blade comprising:

an airfoil;

a first support member flexibly attached to said airfoil; and a second support member flexibly attached to said airfoil;

said first support member and said second support member being attachable to a rotatable hub and movable relative to said rotatable hub to allow a pitch of said rotor blade to be varied;

wherein said rotor blade further comprises a pivot point about which said rotor blade is pivotal about a rotor blade axis extending axially through said rotor blade; and wherein said rotor blade is pivotal via independent axial rotation of a first portion of said hub assembly to which said first support member is attached relative to a second portion of said hub assembly to which said second support member is attached.

18. The rotor blade of claim 17, wherein said airfoil comprises a root through which said first support member and said second support member extend, said root being rotatable on said hub via a bearing.

19. The rotor blade of claim 17, wherein said first support member and said second support member are attachable to said rotatable hub using a preloadable pin.

* * * * *